(12) United States Patent
Uda et al.

(10) Patent No.: US 6,654,129 B1
(45) Date of Patent: Nov. 25, 2003

(54) FILM THICKNESS TESTING APPARATUS AND METHOD

(75) Inventors: Mitsuru Uda, Shiga-ken (JP); Masami Shinohara, Shiga-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/516,039

(22) Filed: Mar. 1, 2000

(30) Foreign Application Priority Data

Mar. 2, 1999 (JP) .............................. 11-53660

(51) Int. Cl.[7] ................................................ G01B 9/02
(52) U.S. Cl. ....................................................... 356/504
(58) Field of Search ................................ 356/504, 630, 356/503

(56) References Cited

U.S. PATENT DOCUMENTS 4,293,224 A * 10/1981 Gaston et al. .............. 356/504
4,952,025 A * 8/1990 Gunning, III ............... 359/586
5,160,576 A * 11/1992 Robbins ....................... 216/60
5,729,343 A * 3/1998 Aiyer .......................... 356/504

FOREIGN PATENT DOCUMENTS

| JP | 53-3260 | | 1/1978 |
| JP | 5-322783 | A | 7/1993 |
| JP | 09145327 | A | 6/1997 |
| JP | 09292207 | A | 11/1997 |

* cited by examiner

Primary Examiner—Samuel A. Turner
Assistant Examiner—Patrick Connolly
(74) Attorney, Agent, or Firm—Ira D. Blecker

(57) ABSTRACT

To provide a film thickness testing apparatus and a film thickness testing method in which coherence between light reflected from the surface of a film and light reflected from the surface of a substrate is improved so as to accurately visually test film thickness irregularities. Film thickness testing is conducted by using a light source part for irradiating a substrate with light having an intensity peak with a half band width of 30 nm or less and having spectral intensity in a peak wavelength region alone.

17 Claims, 8 Drawing Sheets

F I G. 1 4
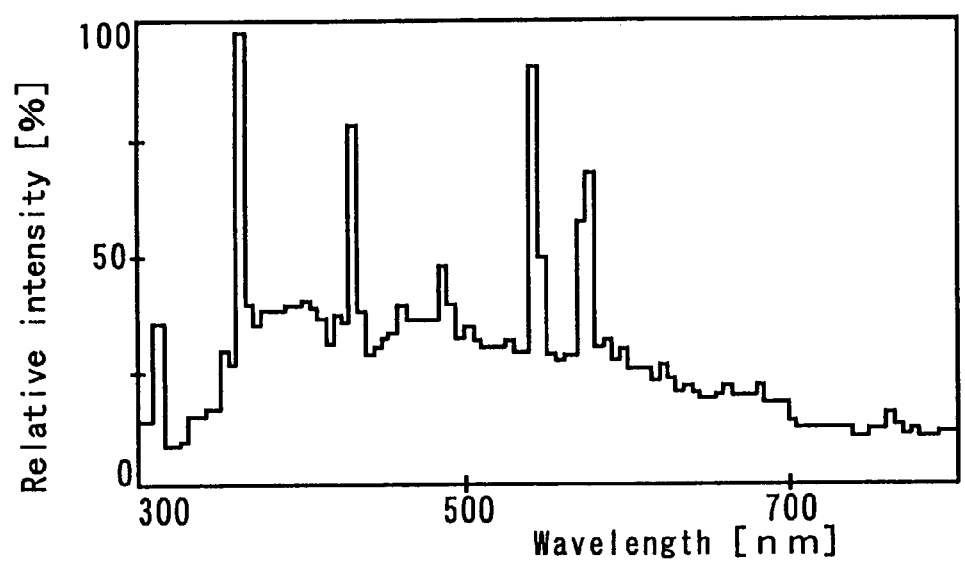

FILM THICKNESS TESTING APPARATUS AND METHOD

FIELD OF THE INVENTION

The present invention relates to a film thickness testing apparatus and a film thickness testing method in which a substrate, such as being made of a semiconductor wafer, bearing a film on the surface thereof is irradiated with light so as to visually test irregularities in the thickness of the film on the basis of interference caused between light reflected from the surface of the film and light reflected from the surface of the substrate.

BACKGROUND OF THE INVENTION

Interference of light is utilized in visually testing a thickness of a resist film or the like coated on the surface of a semiconductor wafer. In this testing, the wafer is irradiated with light, so that thickness irregularities of the resist film or the like can be detected on the basis of the intensity of interference. Specifically, as is shown in FIG. 12, interference is caused between light reflected from the surface of a resist film 12 and light having passed through the resist film 12 and reflected from the surface of a wafer 14. When the refractive index of air is indicated by N0, the refractive index of the resist film 12 is indicated by N1, the angle of incidence is indicated by $\theta$, the angle of refraction is indicated by $\phi$, and the thickness of the resist film 12 is indicated by t, an optical path difference D between these two reflected lights can be represented as follows:

$$\Delta = (ABC) - (AD) = 2 \cdot N1 \cdot t \cdot \cos \phi \tag{1}$$

wherein $N0 \cdot \sin \theta = N1 \cdot \sin \phi$.

When the optical path difference $\Delta$ is as large as an integral multiple of the wavelength $\lambda$ of the incident light, namely, when $$\Delta = m\lambda, \text{ wherein } m = 0, 1, 2, 3, \text{ etc.} \tag{2}$$

the two lights reinforce each other. Alternatively, when the optical path difference $\Delta$ is as large as a half integral multiple of the wavelength $\lambda$ of the incident light, namely, when $$\Delta = m\lambda, \text{ wherein } m = 1/2, 3/2, 5/2, 7/2, \text{ etc.} \tag{3}$$

the two lights neutralize each other. Accordingly, when the refractive indexes N0 and N1 and the angle $\theta$ of incidence are constant, the intensity of the interference caused between these lights is varied depending upon the thickness t of the resist film 12.

As a light source used for such visual testing, a white light source such as a halogen lamp is used. However, in the spectral distribution of a halogen lamp, comparatively high intensity is distributed in a wide range of wavelength as is shown in FIG. 13. Therefore, when a halogen lamp is used, light respectively having various wavelengths satisfying the interference condition represented by Formula (2) interfere with one another. When such various lights interfere one another, it is difficult to recognize a change in the interference derived from a difference in the thickness t of the resist film. Accordingly, the thickness t of the resist film cannot be accurately detected.

As a method of detecting such a small thickness, a metal halide lamp or the like is used to increase the peak intensity of light, so as to increase the contrast of the interference. In the spectral distribution of a metal halide lamp, however, light intensity in a wavelength range apart from the peak wavelength region is higher than that in a halogen lamp as is shown in FIG. 14. Therefore, the interference is largely affected by the light with a wavelength in a region apart from the peak wavelength region. Also, similarly to use of a halogen lamp, light respectively having various wavelengths satisfying Formula (2) interfere one another. Accordingly, small irregularities in the thickness of the resist film cannot be sufficiently detected even by using a metal halide lamp.

Furthermore, Japanese Laid-Open Patent Publication No. 9-145327 discloses a film thickness measuring apparatus using a low coherent light source. This thickness measuring apparatus comprises interference generating means for generating interference by re-synthesizing divided measurement light and reference light, measurement light means for allowing the measurement light to enter multi-layered plastic sheet, reference light means for allowing the reference light to enter a mirror, and thickness detecting means for detecting the thickness of the multi-layered plastic sheet depending upon the position of the mirror placed for causing the interference, and this apparatus uses a low coherent light source.

Since this thickness measuring apparatus uses the low coherent light source, thicknesses of respective layers in the multi-layered sheet, which is traveling during the measurement, are accurately measured regardless of their thicknesses in a wide range even when the sheet is slightly vibrated or inclined. However, a low coherent light source has a spectral width narrower than that of an incoherent light source such as a halogen lamp as well as an optical output and directivity equivalent to those of a coherent light source such as a semiconductor laser. In other words, such a light source is not sufficiently bright for the visual testing where eyes of humans are used as a light receiving portion. Accordingly, this thickness measurement apparatus cannot be used for the visual testing.

An object of the invention is improving interference caused between light reflected from the surface of a film and light reflected from the surface of a substrate so that irregularities in the film thickness can be accurately and visually tested.

This and other objects of the invention will become more apparent after referring to the following description of the invention considered in conjunction with the accompanying drawings.

BRIEF SUMMARY OF THE INVENTION

The film thickness testing apparatus of this invention comprises a light source part for irradiating a substrate with light having an intensity peak with a half band width (full width half maximum) of 30 nm or less.

Also, the film thickness testing method of this invention comprises irradiating a substrate with light having an intensity peak with a half band width (full width half maximum) of 30 nm or less.

BRIEF DESCRIPTION OF THE DRAWINGS

The features of the invention believed to be novel and the elements characteristic of the invention are set forth with particularity in the appended claims. The Figures are for illustration purposes only and are not drawn to scale. The invention itself, however, both as to organization and method of operation, may best be understood by reference to the detailed description which follows taken in conjuction with the accompanying drawings in which:

FIG. 14 is a diagram for showing the intensity distribution in light emitted by a metal halide lamp.

DETAILED DESCRIPTION OF THE INVENTION

Now, a preferred embodiment of the film thickness testing apparatus and method according to this invention will be described in detail on the basis of accompanying drawings by exemplifying film thickness testing for a resist film formed on a semiconductor wafer.

Figure 2:
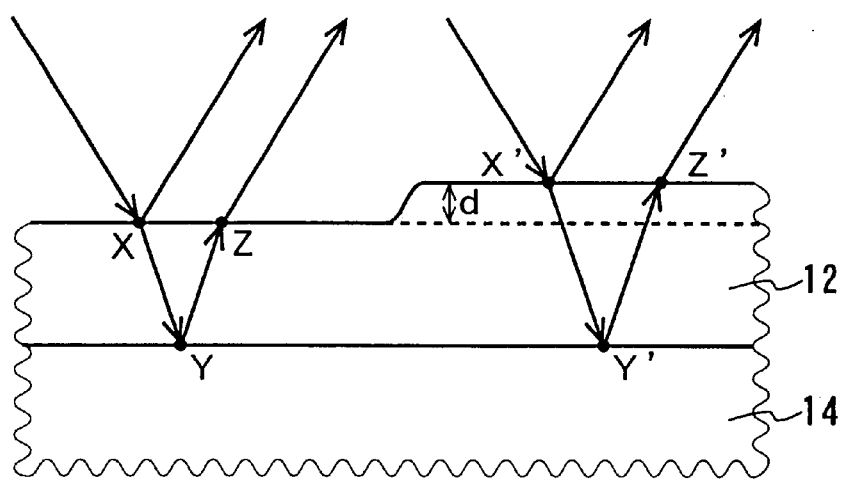
FIG. 2 is an enlarged view of a main part of a resist film and a wafer of FIG. 1.

FIG. 2 is a schematic diagram of an optical path difference caused due to a thickness difference d in a resist film 12 formed on the surface of a semiconductor wafer 14. When the resist film 12 has such a thickness difference d, the optical path difference Δ derived from the thickness difference d is represented as follows:

$$\Delta = (X'Y'Z') - (XYZ)$$

When the optical path difference Δ is as large as an integral multiple of the wavelength λ of incident light, namely, when $$\Delta = m\lambda, \text{ wherein } m \text{ is an integer} \quad (4)$$

these two lights reinforce each other.

Figure 3:
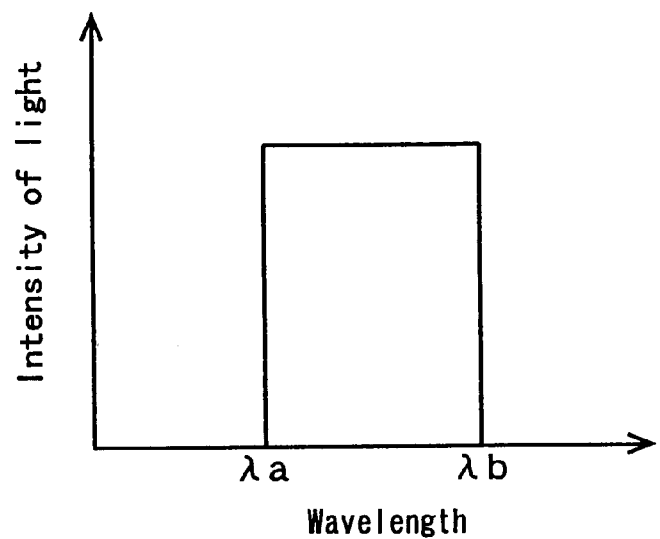
FIG. 3 is a diagram for showing an example of the intensity distribution in light used for irradiating a wafer.
Figure 4:
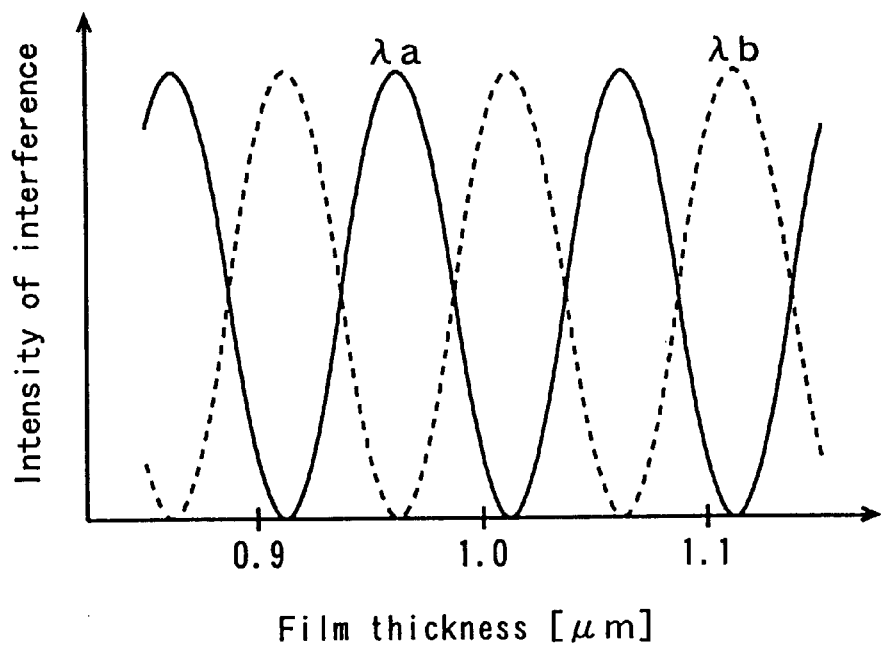
FIG. 4 is a diagram for showing an example of the intensity distribution in interference obtained when a wavelength λa is 546 nm and a wavelength λb is 576 nm in incident light of FIG. 3.

At this point, it is assumed, as is shown in FIG. 3, that the spectral intensity of the incident light is distributed in a wavelength width between a wavelength λa and a wavelength λb and that respective wavelengths (λa, . . . and λb) have the same spectral intensity. In this case, the lights at the respective wavelengths (λa, . . . and λb) reinforce each other when they satisfy Formula (4). In using light with the two wavelengths λa and λb of 546 nm and 576 nm under conditions of a desired thickness of the resist film 12 of 0.8 μm, the refractive index of the resist film 12 of 1.65 and the incident angle of 55°, the intensity distribution in the interference of the light with the wavelengths λa and λb derived from the thickness difference d can be roughly illustrated as in FIG. 4. In FIG. 4, the interference caused when the thickness difference d is +0.1 through +0.3 μm (namely, the film thickness is varied between 0.9 and 1.1 μm) is mainly shown. This diagram reveals that the intensity of the interference is varied in accordance with the film thickness.

Figure 5:
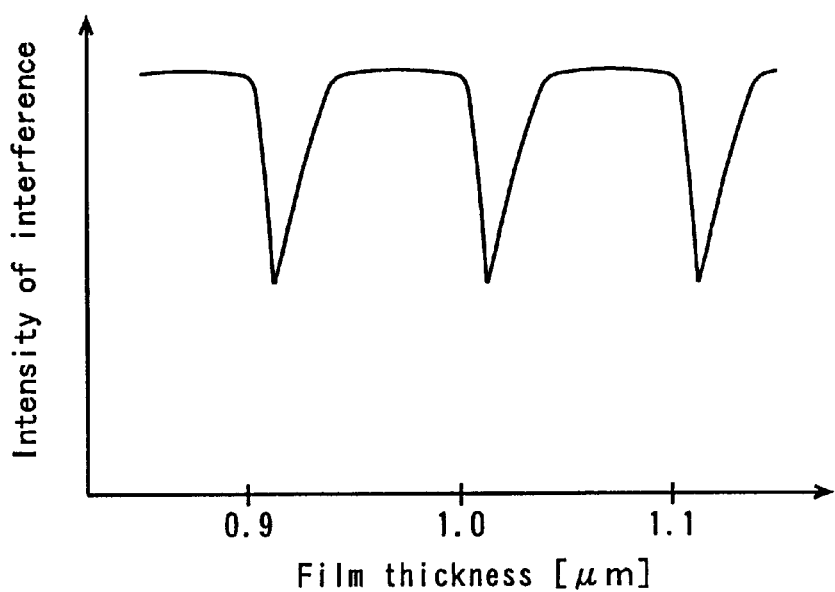
FIG. 5 is a diagram for showing an example of the intensity distribution in interference at wavelengths λa, . . . , and λb obtained when the incident light of FIG. 3 has an intensity peak with a half band width of 30 nm.

However, the incident light has a uniform intensity distribution between the wavelengths λa (546 nm) and λb (576 nm) as is shown in FIG. 3. Therefore, the intensity distribution of the interference (at the wavelengths λa, . . . and λb) can be roughly illustrated as in FIG. 5. In FIG. 5, the intensity of the interference is merely partly varied in accordance with the film thickness and the intensity of the interference can be regarded as substantially constant. In other words, when incident light has a ~30 nm-intensity distribution having a wavelength width of the intensity peak as shown in FIG. 3, the intensity of the interference is substantially constant regardless of the film thickness. Also, a range of variation in the intensity (i.e., a difference between the maximum intensity and the minimum intensity) is so small that a difference in the intensity of the interference is difficult to recognize. This means that the thickness difference d of the resist film 12 is difficult to detect by using the interference of light. Accordingly, the peak wavelength width of the incident light is required to be set to 30 nm or less.

Figure 1:
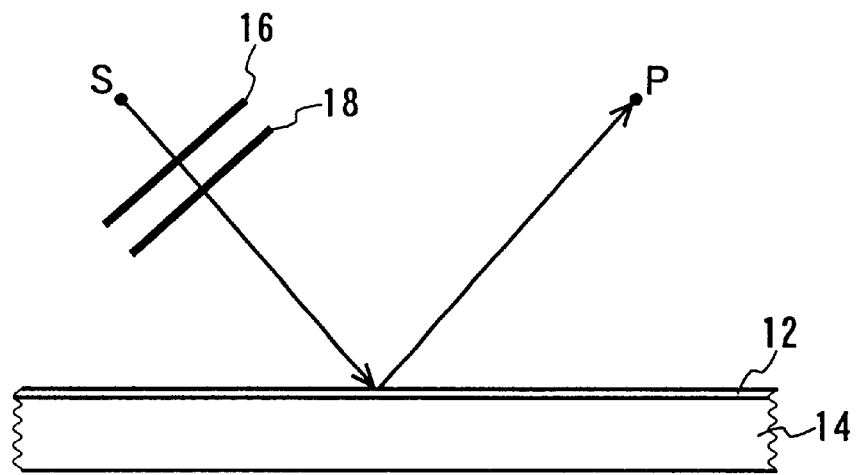
FIG. 1 is a diagram for illustrating the outline of an embodiment of film thickness testing apparatus and method according to the present invention.

FIG. 1 shows an outline of the film thickness testing apparatus and the method for the same testing of this invention. In FIG. 1, the light source part S irradiates the wafer 14 with light, and light reflected from the surfaces of the resist film 12 and the wafer 14 reaches an eye P of a tester. Between the light source part S and the wafer 14, an optical filter 16 and a diffusing plate 18 are disposed. The optical filter 16 cuts light with a wavelength of 430 nm or less in order to prevent exposure of the resist film 12.

Figure 6:
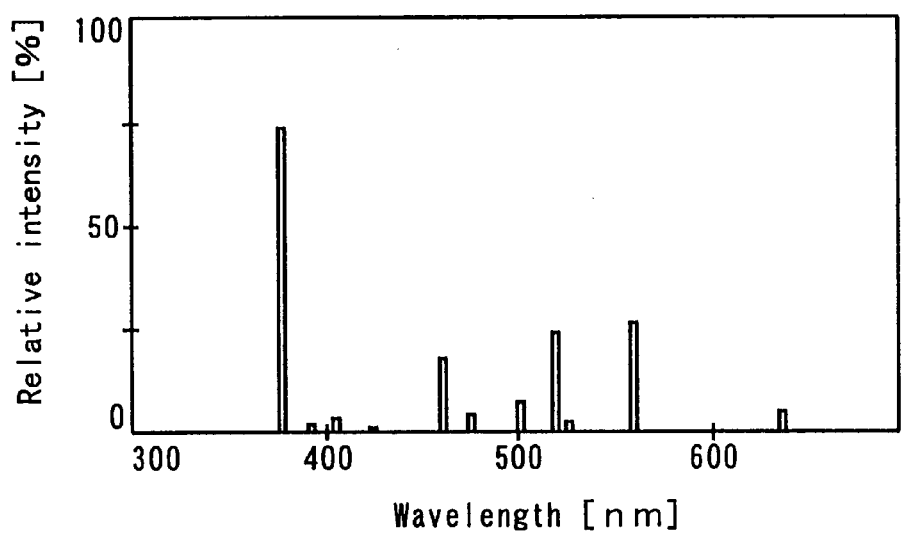
FIG. 6 is a diagram for showing an intensity distribution in light emitted by a helium lamp.

As the light source part S, a light source for emitting light having an intensity peak with a half band width of 30 nm or less and having no spectral intensity distributed in a region apart from the peak wavelength region like a helium lamp shown in FIG. 6 is used. Alternatively, when a light source for emitting light having an intensity peak with a half band width exceeding 30 nm is used, the half band width (the wavelength width) of the intensity peak can be narrowed to 30 nm or less by using an optical filter. Similarly, when a light source for emitting light having spectral intensity distributed in a region apart from the peak wavelength region is used, the spectral intensity distributed in a region apart from the peak wavelength region can be cut by using an optical filter. Furthermore, since the film thickness testing apparatus and method of this invention are used in visual testing, the light source used therein is required to have illuminance equivalent to that of a fluorescent lamp (i.e., approximately 300 lx).

Also, the light emitted from the light source part to the wafer 14 preferably includes two or more peak wavelengths having no spectral intensity in a region apart from the peak wavelength region and having a half band width of 30 nm or less. When such two or more peak wavelengths are included, a portion where the intensity of the interference is lowered can mutually be compensated even when the angle of the incident light against the wafer 14 is changed or the like. Accordingly, even when the position of the eye of the tester or the thickness difference is arbitrarily changed, a small thickness difference can be detected sufficiently. Also, when such two or more peak wavelengths are included, the intensity of the incident light can be retained at sufficient illuminance for visual testing. However, when the two or more peak wavelengths are too close to each other, the interference at the respective wavelengths simultaneously enter the eye of the tester. As a result, the interference is combined, so that a thickness difference becomes difficult to recognize. Accordingly, the two or more peak wavelengths are preferably away from each other. In particular, they are preferably away from each other by 30 nm or more as is shown in FIG. 5.

When the light emitted from the light source part to the wafer 14 includes merely one peak wavelength having no spectral intensity in a region apart from the peak wavelength region and having a half band width of 30 nm or less, the apparatus and the method are preferably provided with incident angle adjusting means for adjusting the angle of the incident light against the wafer 14. When the incident angle adjusting means is used, the optical path difference $\Delta$ is changed by adjusting the angle of the incident light, so that the intensity of the interference can be optimally kept. Specifically, even when the intensity of the interference is so low that the detection sensitivity is lowered, the intensity of the interference can be increased by adjusting the angle of the incident light.

Figure 7:
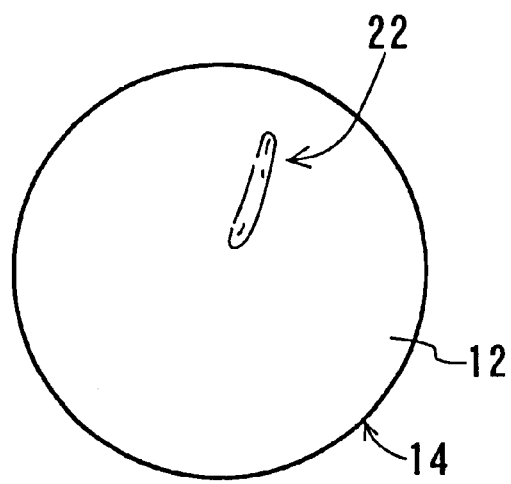
FIGS. 7(a) through 7(c) are diagrams for illustrating the outline of interference (derived from thickness irregularities in a resist film) obtained by using the film thickness testing apparatus and method of FIG. 1.
Figure 7:
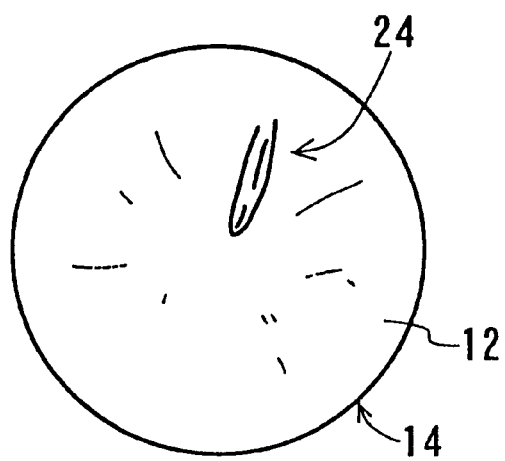
Figure 7:
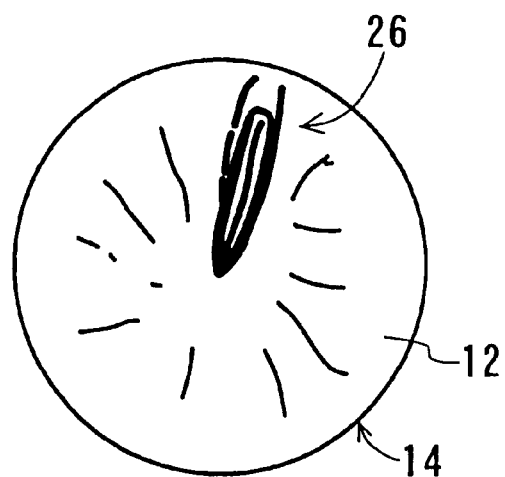

Interference fringes (corresponding to film thickness irregularities) obtained by irradiating the wafer 14 with light having an intensity peak with a half band width of 30 nm, 20 nm and 10 nm are respectively shown in FIGS. 7($a$) through 7($c$). The measurement conditions adopted in this case are the same as those described above with reference to FIG. 3 through 5. When the half band width (wavelength width) is 30 nm (namely, when $\lambda a=546$ nm and $\lambda b=576$ nm), the intensity of the interference is substantially constant against the film thickness as is shown in FIG. 5. Accordingly, as is shown in FIG. 7($a$), a thickness irregular portion 22 can be merely slightly recognized.

Figure 8:
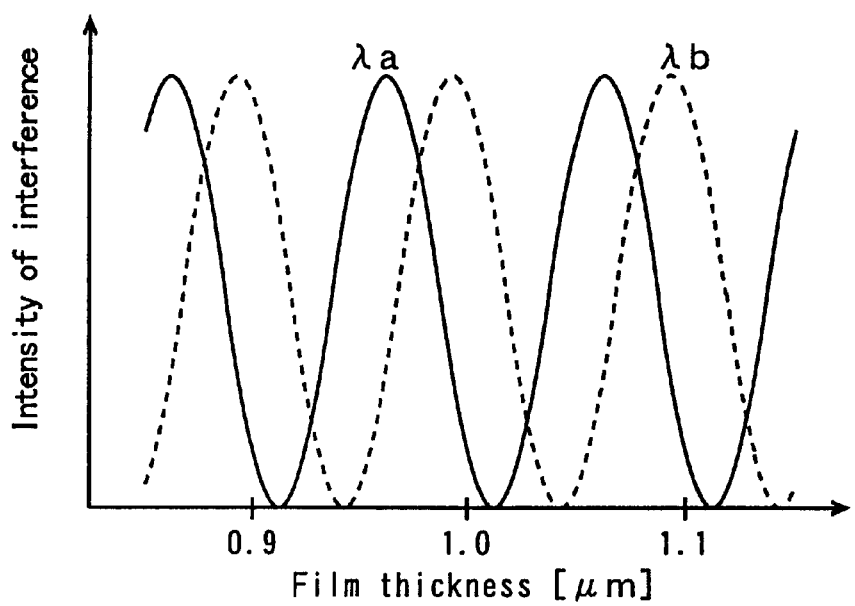
FIG. 8 is a diagram for showing an example of the intensity distribution in interference obtained when the wavelength λa is 546 nm and the wavelength λb is 566 nm in the incident light of FIG. 3.
Figure 9:
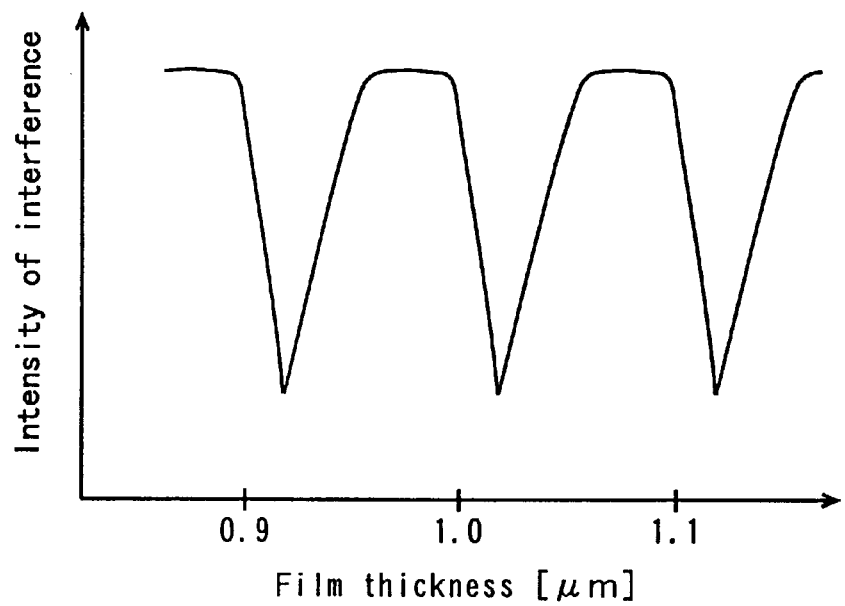
FIG. 9 is a diagram for showing an example of the intensity distribution in interference at wavelengths λa, . . . , and λb obtained when the incident light of FIG. 3 has an intensity peak with a wavelength width of 20 nm.

When the half band width (wavelength width) is 20 nm (namely, when $\lambda a=546$ nm and $\lambda b=566$ nm), the intensity distribution in the interference of the light with the wavelengths $\lambda a$ and $\lambda b$ can be illustrated as in FIG. 8, and the intensity distribution in the interference at the wavelengths $\lambda a, \ldots,$ and $\lambda b$ can be illustrated as in FIG. 9. In FIG. 9, as compared with FIG. 5 where the half band width is 30 nm, a region where the intensity is constant, is smaller and the variation in the intensity (i.e., a difference between the maximum intensity and the minimum intensity) is larger. Accordingly, the intensity of the interference is more largely varied against changes of the film thickness, and hence, a thickness irregular portion 24 can be more easily recognized as is shown in FIG. 7($b$).

Figure 10:
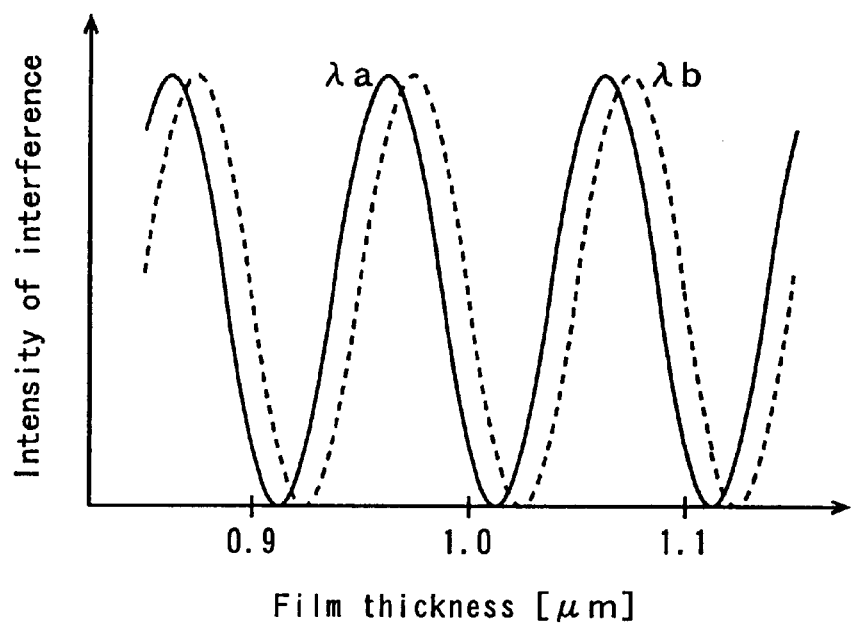
FIG. 10 is a diagram for showing an example of the intensity distribution in interference obtained when the wavelength λa is 546 m and the wavelength λb is 556 nm in the incident light of FIG. 3.
Figure 11:
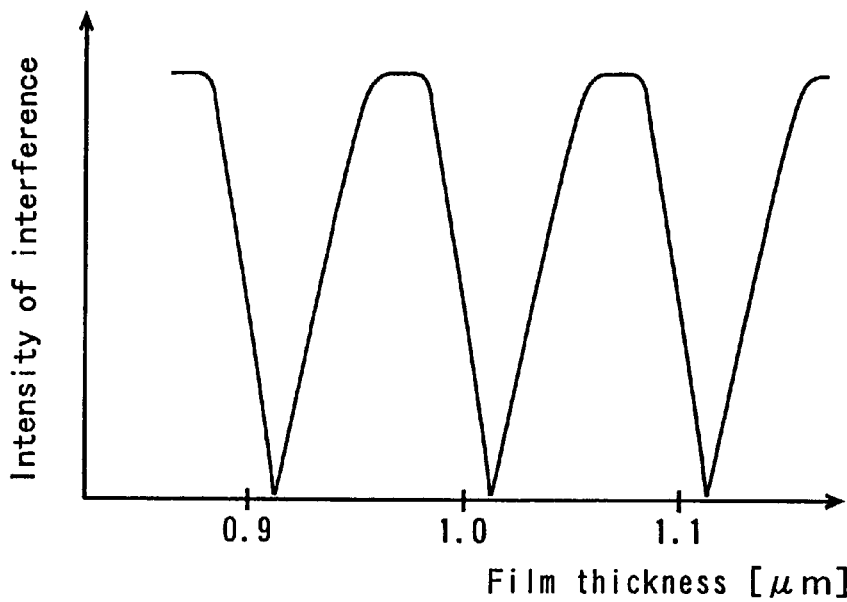
FIG. 11 is a diagram for showing an example of the intensity distribution in interference at wavelengths λa, . . . , and λb obtained when the incident light of FIG. 3 has an intensity peak with a wavelength width of 10 nm.
Figure 12:
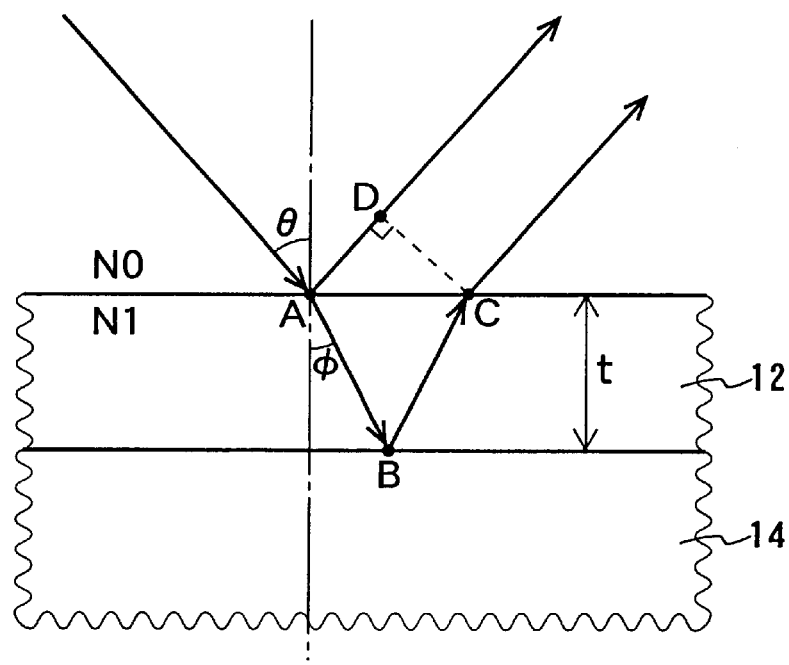
FIG. 12 is a diagram for illustrating the outline of film thickness testing utilizing interference of light.
Figure 13:
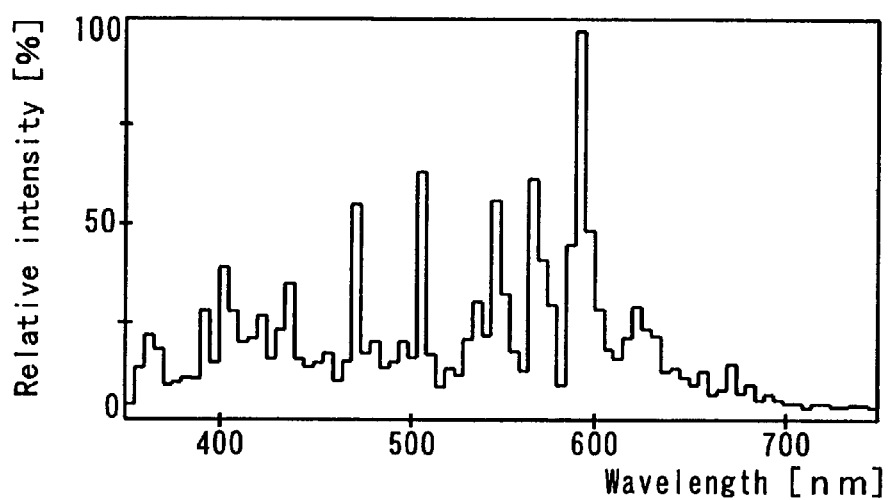
FIG. 13 is a diagram for showing the intensity distribution in light emitted by a halogen lamp.

When the half band width (wavelength width) is 10 nm (namely, when $\lambda a=546$ nm and $\lambda a=556$ nm), the intensity distribution in the interference of the light with the wavelengths $\lambda a$ and $\lambda b$ can be illustrated as in FIG. 10 and the intensity distribution in the interference at the wavelengths $\lambda a, \ldots,$ and $\lambda b$ can be illustrated as in FIG. 11. In FIG. 11, as compared with FIG. 5 where the half band width is 30 nm, a portion where the intensity is constant is further smaller and the variation in the intensity (i.e., a difference between the maximum intensity and the minimum intensity) is further larger. Accordingly, the intensity of the interference is further largely varied against changes of the film thickness, and hence, a thickness irregular portion 26 can obviously be recognized as is shown in FIG. 7($c$).

In this manner, the light emitted from the light source part to the wafer is required to have an intensity peak with a half band width of 30 nm or less, preferably 20 nm or less, and more preferably 10 nm or less.

The embodiment of the film thickness testing apparatus and method according to the present invention have variously been described so far on the basis of the accompanying drawings, but the invention is not limited to the embodiment shown in the drawings. Also, any and all modifications, variations or equivalent arrangements which may occur to those skilled in the art should be considered to be within the scope of the invention.

According to the film thickness testing apparatus and method of the present invention, a substrate such as a wafer is irradiated with light having an intensity peak with a half band width of 30 nm or less and having no spectral intensity in a region apart from a peak wavelength region. As a result, coherence is so improved that film thickness irregularities can be accurately visually tested.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

We claim:

1. A film thickness testing apparatus for visually testing film thickness irregularities by irradiating a substrate bearing a film on a surface thereof with light and using interference caused between light reflected from a surface of the substrate, comprising:
   a light source part for irradiating the substrate and film with light having at least two intensity peaks each with a half band width of 30 nm or less.

2. The film thickness testing apparatus according to claim 1 wherein said light source part includes a light source for generating light having an intensity peak with a half band width of 30 nm or less.

3. The film thickness testing apparatus according to claim 1, wherein said light source part includes a light source and an optical filter for narrowing a wavelength width of an intensity peak of light generated by said light source to 30 nm or less.

4. The film thickness testing apparatus according to claim 2, wherein said light source generates light having spectral intensity distributed in a peak wavelength region alone.

5. The film thickness testing apparatus according to claim 1, wherein said light source part includes an optical filter for cutting spectral intensity distributed in a region apart from a peak wavelength region of the light irradiating the substrate.

6. The film thickness testing apparatus according to claim 1, wherein said substrate is made of a semiconductor wafer.

7. The film thickness testing apparatus according to claim 1, further comprising incident angle adjusting means for adjusting an angle of incidence of the light irradiating said substrate.

8. The film thickness testing apparatus of claim 1 wherein the at least two intensity peaks are separated from each other by at least 30 nm.

9. The film thickness testing apparatus of claim 1 wherein the at least two intensity peaks are separated from each other by at least 30 nm. and each intensity peak having a spectral intensity distributed in a peak wavelength region only.

10. A film thickness testing method for testing film thickness irregularities comprising irradiating a substrate bearing a film on a surface thereof with light having at least two intensity peaks each with a half band width of 30 nm or less and visually observing interference caused between light reflected from a surface of the film and light reflected from a surface of the substrate.

11. The film thickness testing method according to claim 10, wherein said step of irradiating includes a step of narrowing a wavelength width of an intensity peak of the light irradiating the substrate to 30 nm or less.

12. The film thickness testing method according to claim 10, wherein said irradiating step includes a step of cutting spectral intensity distributed in a region apart from a peak wavelength region of the light irradiating the substrate.

13. The film thickness testing method according to claim 10, further comprising the step of adjusting an angle of incidence of the light irradiating the substrate.

14. The film thickness testing method of claim 10 wherein the at least two intensity peaks are separated from each other by at least 30 nm.

15. The film thickness testing method of claim 10 wherein the at least two intensity peaks are separated from each other by at least 30 nm. and further including the step of cutting spectral intensity distributed in a region apart from a peak wavelength region for each of the at least two intensity peaks of the light irradiating the substrate.

16. A film thickness testing apparatus for visually testing film thickness irregularities by irradiating a substrate bearing a film on a surface thereof with light and using interference caused between light reflected from a surface of the substrate, comprising:

a light source part for irradiating the substrate and film with light only having intensity peaks each with a half band width of 30 nm or less, there being at least two such intensity peaks, said light source part further generating light having spectral intensity distributed only in regions defined by the intensity peaks, said light reflecting from a surface of the substrate causing interference between the intensity peaks due to film thickness irregularities so as to visually test for film thickness irregularities.

17. A film thickness testing method for testing film thickness irregularities comprising irradiating a substrate bearing a film on a surface thereof with light only having intensity peaks each with a half band width of 30 nm or less, there being at least two such intensity peaks, said light further having spectral intensity distributed only in regions defined by the intensity peaks, and visually observing interference caused between light reflected from a surface of the film and light reflected from a surface of the substrate.

* * * * *